US012172292B1

(12) United States Patent
Skarlovnik et al.

(10) Patent No.: US 12,172,292 B1
(45) Date of Patent: Dec. 24, 2024

(54) SNOW REMOVAL HAMMER

(71) Applicants: Michel Skarlovnik, Kemptville (CA); Wendy Barry, Kemptville (CA)

(72) Inventors: Michel Skarlovnik, Kemptville (CA); Wendy Barry, Kemptville (CA)

( * ) Notice: Subject to any disclaimer, the term of this patent is extended or adjusted under 35 U.S.C. 154(b) by 311 days.

(21) Appl. No.: 17/723,632

(22) Filed: Apr. 19, 2022

(51) Int. Cl.

| | |
|---|---|
| ***B25G 1/04*** | (2006.01) |
| ***B25D 1/02*** | (2006.01) |
| ***B25G 3/30*** | (2006.01) |
| ***E04D 13/10*** | (2006.01) |

(52) U.S. Cl.
CPC ................. *B25G 1/04* (2013.01); *B25D 1/02* (2013.01); *B25G 3/30* (2013.01); *E04D 13/106* (2013.01)

(58) Field of Classification Search
CPC ... B25G 1/04; B25G 3/30; B25G 3/10; B25D 1/02; E04D 13/106; A01B 1/02; A01B 1/026
USPC ................................................................ 81/25
See application file for complete search history.

(56) References Cited

U.S. PATENT DOCUMENTS

| | | | | |
|---|---|---|---|---|
| 576,756 | A * | 2/1897 | Cole | A01B 1/022 7/167 |
| 4,373,565 | A * | 2/1983 | Soto | B25D 1/02 81/22 |
| 5,524,369 | A * | 6/1996 | Phillips | E04D 13/106 37/285 |
| 5,996,442 | A | 12/1999 | Carmien | |
| 9,447,582 | B2 | 9/2016 | Even | |
| 2003/0136029 | A1* | 7/2003 | Nieckula | E04D 13/106 37/265 |
| 2017/0057074 | A1* | 3/2017 | D'Avignon | A01B 1/02 |
| 2019/0315318 | A1* | 10/2019 | Wake | B25G 1/04 |

* cited by examiner

*Primary Examiner* — Hadi Shakeri
(74) *Attorney, Agent, or Firm* — Sanchelima & Associates, P.A.; Christian Sanchelima; Jesus Sanchelima

(57) ABSTRACT

A snow removal hammer including a first pole assembly, a second pole assembly and a striking assembly. The first pole assembly includes a first pole. The first pole has a proximal end and a distal end. The proximal end of the first pole has a threaded portion. The second pole assembly includes a second pole. The second pole is telescopically inserted into the distal end of the first pole. The striking assembly includes a striking head. The striking head is threadedly attached to the first pole. The striking head is used to strike and smash ice that accumulates in roofs.

5 Claims, 4 Drawing Sheets

SNOW REMOVAL HAMMER

BACKGROUND OF THE INVENTION

1. Field of the Invention

The present invention relates to a snow removal hammer and, more particularly, to a snow removal hammer that allows to smash and strike ice of roofs.

2. Description of the Related Art

Several designs for a snow removal hammer have been designed in the past. None of them, however, include an elongated pole to reach hard to reach zones.

Applicant believes that a related reference corresponds to U.S. Pat. No. 5,996,442 issued for a striking tool having a modular handle and rubber striking tips. Applicant believes that another related reference corresponds to U.S. Pat. No. 9,447,582 issued an ice dam prevention shield which is a device that is installed onto a roof to prevent the formation of an ice dam and to allow the user to easily remove the ice dam by striking an ice dam that has formed on top of the device with a striking tool. None of these references, however, teach of a snow removal device comprising a rubber striking head, and an elongated shaft handle which is threadedly attached to the striking head.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a snow removal hammer that includes a striking head to strike and smash ice.

It is another object of this invention to provide a snow removal hammer that includes an elongated retractable pole to reach hard to reach zones while remaining support in the tube.

It is still another object of the present invention to provide a snow removal hammer that includes a pole with threaded end to accommodate different striking heads.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
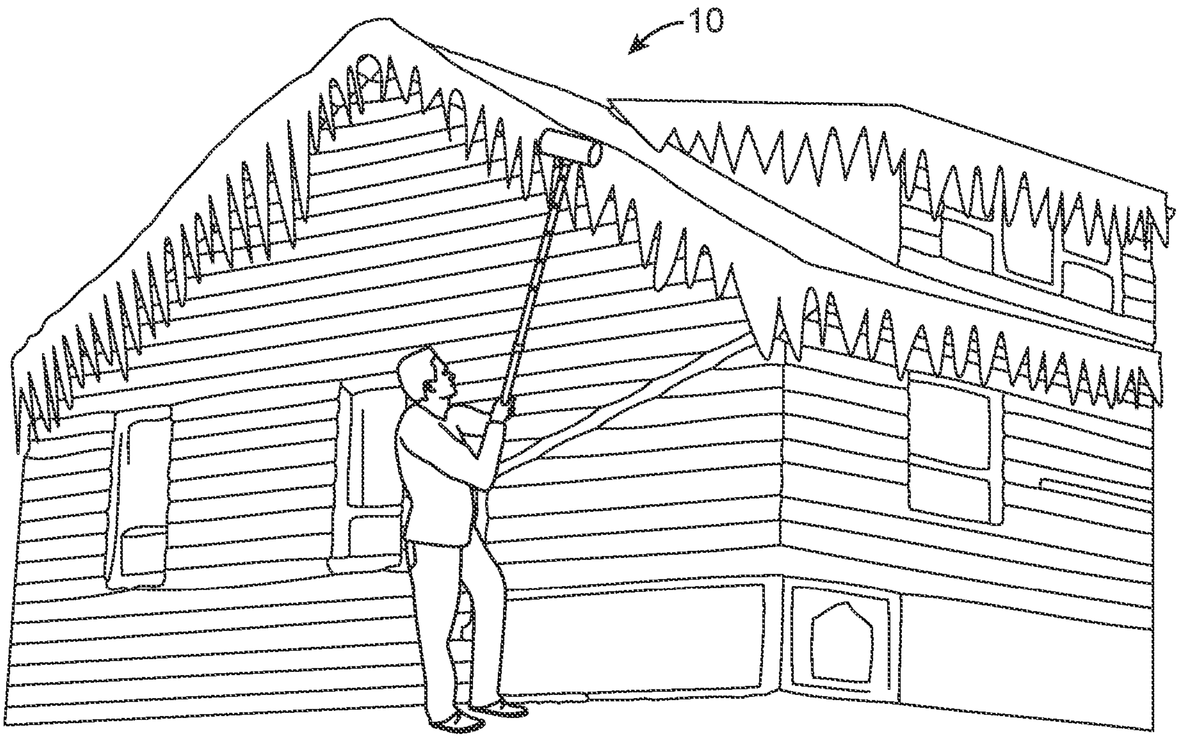
FIG. 1 represents an isometric operational view of the present invention 10 wherein a user is smashing ice.

Referring now to the drawings, where the present invention is generally referred to with numeral 10, it can be observed that it basically includes a first pole assembly 20, a second pole assembly 40 and a striking assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The first pole assembly 20 may include a first pole 24, a reinforcement covering 28 and a plurality of openings 26. The first pole 24 may be made of metal, plastic, or any other resistant material. In a preferred embodiment the first pole 24 may be cylindrical shaped. It also may be suitable to have the first pole 24 having a rectangular shape, a triangular shape, or any other suitable shape. The first pole 24 may have a distal end and a proximal end. The first pole 24 may be hollow.

The reinforcement covering 28 may be attached to a distal end of the first pole 24. The reinforcement covering 28 may reinforce the junction of the first pole assembly 20 and the second pole assembly 40. The reinforcement covering 28 may be made of plastic. It also may be suitable for the reinforcement covering 28 to be made of metal, wood, or any other resistant material. The reinforcement covering 28 may be cylindrical shaped. It also may be suitable for the reinforcement covering 28 to have a rectangular shape, a triangular shape, or any other suitable shape. The proximal end of the first pole 24 may be threaded to connect the striking assembly 60. The plurality of openings 26 may be disposed along the first pole 24. The plurality of openings 26 may transversally go through the first pole 24. The plurality of openings 26 may have a circular shape. It also may be suitable for the plurality of openings 26 may have a rectangular shape, a triangular shape, or any other suitable shape. In a preferred embodiment the second pole assembly 40 may be telescopically inserted into the first pole assembly 20. It also may be suitable to have the first pole assembly 20 inserted into the second pole assembly 40.

The second pole assembly 40 may include a second pole 42, at least one prong 44 and a handle 46. The second pole 42 may be made of metal, plastic, or any other resistant material. In a preferred embodiment the second pole 42 may be cylindrical shaped. It also may be suitable to have the second pole 42 having a rectangular shape, a triangular shape, or any other suitable shape. The second pole 42 may have a distal end and a proximal end. The second pole 42 may have an opening on the distal and proximal end. The second pole 42 may be hollow. The distal end of the second pole 42 may be inserted into the handle 46.

The handle 46 may be used to hold the present invention 10. In a preferred embodiment the handle 46 may be cylindrical shaped. It also may be suitable for the handle 46 to have a rectangular shape, a triangular shape, or any other suitable shape. It also may be suitable for the handle 46 to present shape variations to be easily hold for a user. The handle 46 may be made of plastic, leather, metal, or any other suitable material. It also may be suitable to have the handle 46 having an opening in an upper part of the handle 46 to be hang.

The at least one prong 44 may be perpendicularly disposed in the second pole 42. The at least one prong 44 is movable. The at least one prong 44 may go into the second pole 42 and partially go out. In a preferred embodiment the at least one prong 44 may go into the second pole 42 to telescopically slide the second pole 42 through the first pole 24. In a preferred embodiment the at least one prong 44 may partially go out to fix the second pole 42 in a predetermined position into the first pole 24. The at least one prong 44 may be cylindrical shaped. It also may be suitable for the at least one prong 44 to have a rectangular shape, a triangular shaper, or any other suitable shape. The at least one prong 44 may fit into one of the plurality of openings 26 to fix the second pole 42 in a predetermined position into the first pole 24. It also may be suitable to have different mechanism to hold the second pole 42 in a predetermined position into the first pole 24. It also may be suitable to have additional poles telescopically inserted between the first pole assembly 40 and the second pole assembly 60.

Figure 2:
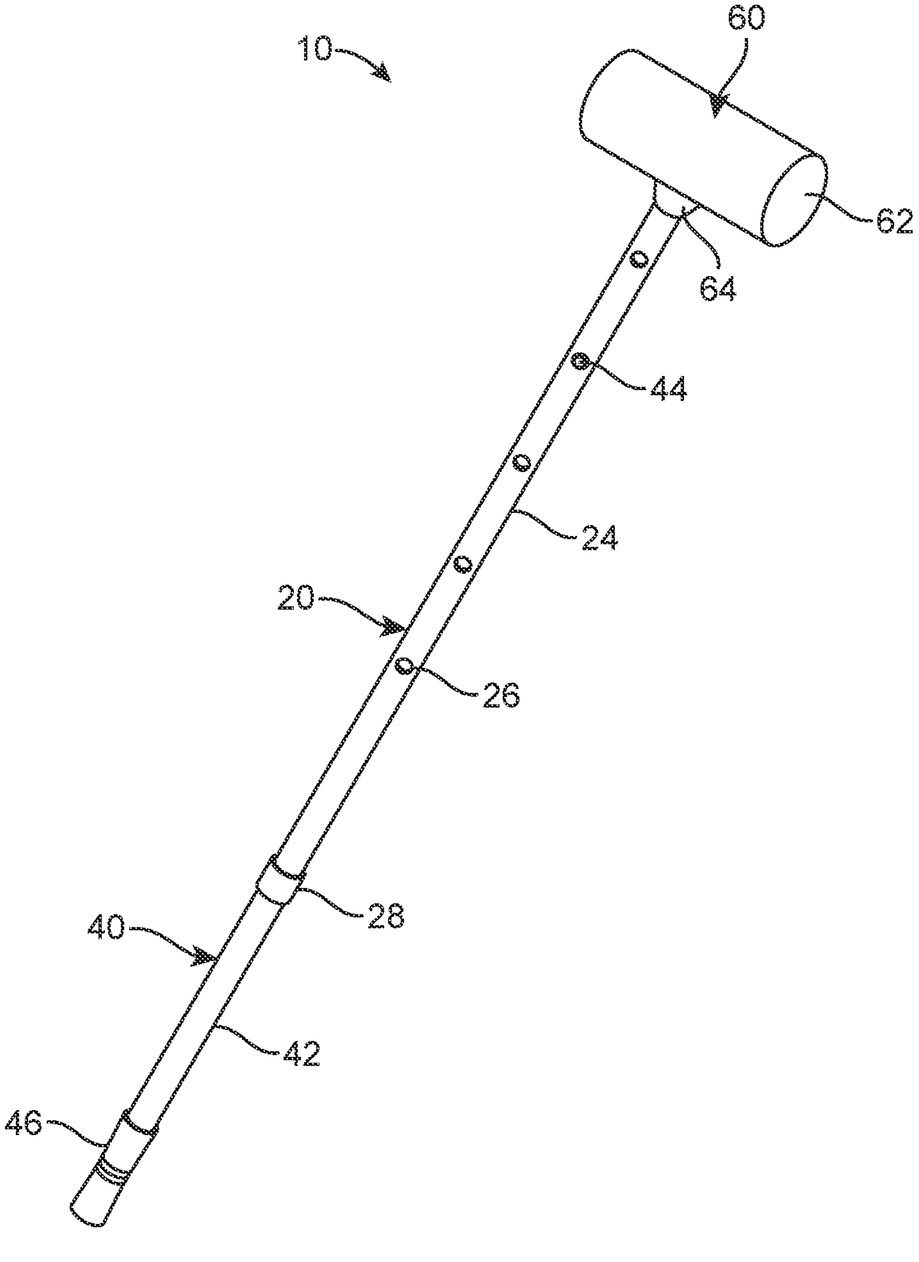
FIG. 2 shows an isometric view of present invention 10. The present invention 10 includes a first pole assembly 20, a second pole assembly 40 and a striking assembly 60.
Figure 3:
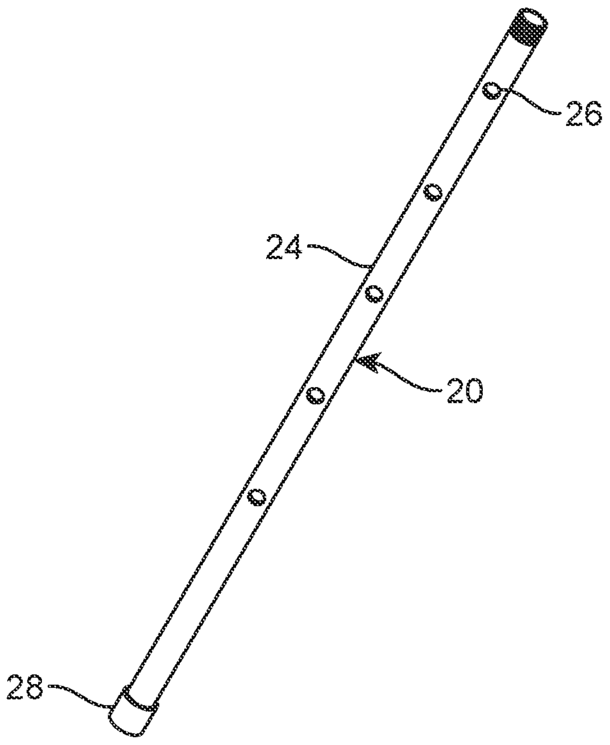
FIG. 3 illustrates an enlarged view of the first pole assembly 20. The first pole assembly 20 includes a first pole 24, holes 26 and supporting portion 28.
Figure 4:
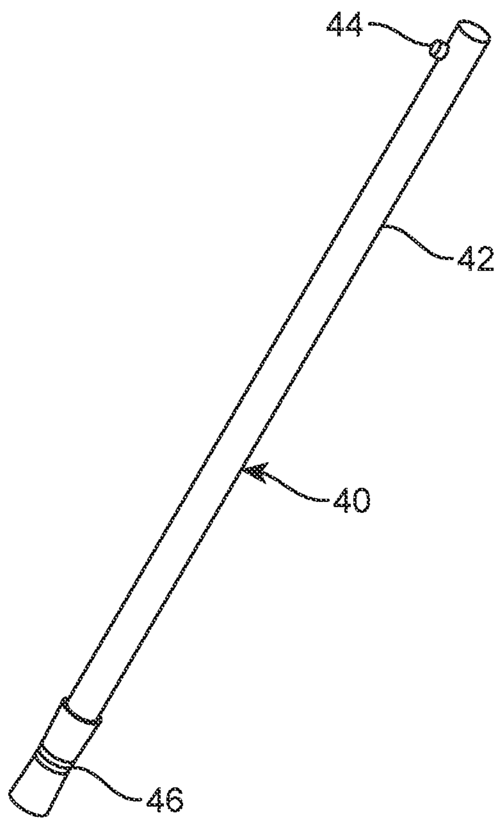
FIG. 4 is a representation of an enlarged view of the second pole assembly 40. The second pole assembly 40 includes a second pole 42, at least one prong 44 and a handle 46.

Referring now to FIG. 2 the striking assembly 60 may include a striking head 62 and a junction portion 64. In a preferred embodiment the striking head 62 has a cylindrical shape. It also may be suitable for the striking head 62 to have a rectangular shape, a triangular shape, or any other suitable shape. In a preferred embodiment the striking head 62 is a mallet hammer head. It also may be suitable for the striking head 62 to be a tack hammer head, a boiler scaling hammer head or the like. In a preferred embodiment the striking head 62 is made of plastic. The mallet hammer head made of rubber is known in the prior art to be a lightweight hammer head. It also may be suitable for the striking head 62 to be made of wood, leather, metal, solid rubber, or any other suitable material.

The junction portion 64 may connect and reinforce the junction of the striking head 62 with the first pole assembly 20. The junction portion 64 may be made of plastic, wood, rubber, leather, or any other suitable material. In a preferred embodiment the striking head 62 may be threadedly attached to the first pole assembly 20. The striking head 62 may be remove and replace from the first pole assembly 20. In a preferred embodiment a user may adjust the first pole assembly 20 and the second pole assembly 40 to reach a predetermined distance and use the striking head 62 to strike and smash ice or any other suitable object.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A snow removal hammer, comprising:

a first pole assembly, wherein said first pole assembly includes a first pole, said first pole has a proximal end and a distal end, said proximal end has threaded portion;

a second pole assembly, wherein said second pole assembly includes a second pole and a handle, said second pole is telescopically inserted into said distal end of said first pole, said handle is attached to a distal end of said second pole, said handle has a central portion having a diameter smaller than a diameter of a distal end and proximal end of said handle defining a concave shape wherein said second pole slides telescopically through said first pole;

a striking assembly, wherein said striking assembly includes a striking head, said striking head is threadedly attached to said proximal end of said first pole, wherein said striking head is a mallet hammer head, wherein said mallet hammer is made of rubber plastic, said striking head includes a junction portion in a bottom end thereof, said proximal end of said first pole is threadably coupled to said junction portion, said junction portion has a trapezoid shape, wherein said handle is configurated to hold said snow removal hammer; and wherein said first pole assembly includes a reinforcement covering, said reinforcement covering is attached to said distal end of said first pole, said reinforcement covering reinforces a junction of said first pole and said second pole.

2. The snow removal hammer set forth in claim 1, wherein said first pole and said second pole are hollow.

3. The snow removal hammer set forth in claim 1, wherein said first pole has a plurality of openings, said plurality of openings transversally go through said first pole.

4. The snow removal hammer set forth in claim 3, wherein said second pole has at least one prong, said at least one prong fits into one of said plurality of openings to fix said second pole in a predetermined position inside said first pole.

5. A snow removal hammer, consisting of:

a first pole assembly, wherein said first pole assembly includes a first pole, a plurality of openings and a reinforcement covering, said plurality of openings are disposed along said first pole, said plurality of openings transversally go through said first pole, said first pole has a proximal end and a distal end, said proximal end is threaded, said reinforcement covering is attached to said distal end of said first pole;

a second pole assembly, wherein said second pole assembly includes a second pole, a handle, prongs, wherein each of said prongs fit into one of said plurality of openings to fix said second pole in a predetermined position inside said first pole, said second pole slides telescopically through said first pole, said handle is configurated to hold said snow removal hammer, said second pole is telescopically inserted into said distal end of said first pole, said reinforcement covering reinforces a junction of said first pole and said second pole, said first pole and said second pole are hollow, wherein said handle is attached to a distal end of said second pole, said handle has a central portion having a diameter smaller than a diameter of a distal end and proximal end of said handle defining a concave shape, said central portion of said handle has ridging portions; and a striking assembly, wherein said striking assembly includes a striking head and a junction portion, said junction portion has a trapezoid shape, said striking head is a mallet hammer head, said mallet hammer head is made of rubber plastic, wherein said proximal end of said first pole is threadably attached to said junction portion, said junction portion is in a bottom end of said striking head, said junction portion reinforces the junction of said striking head and said first pole.

* * * * *